(12) United States Patent
Brock et al.

(10) Patent No.: US 10,296,753 B2
(45) Date of Patent: May 21, 2019

(54) PERMISSION COMPARATOR

(71) Applicant: salesforce.com, inc., San Francisco, CA (US)

(72) Inventors: John Arlan Brock, San Francisco, CA (US); Adam Torman, Walnut Creek, CA (US)

(73) Assignee: SALESFORCE.COM, INC., San Francisco, CA (US)

( * ) Notice: Subject to any disclaimer, the term of this patent is extended or adjusted under 35 U.S.C. 154(b) by 0 days.

(21) Appl. No.: 14/676,640

(22) Filed: Apr. 1, 2015

(65) Prior Publication Data

US 2016/0063270 A1 Mar. 3, 2016

Related U.S. Application Data

(60) Provisional application No. 62/041,748, filed on Aug. 26, 2014.

(51) Int. Cl.
*G06F 21/62* (2013.01)

(52) U.S. Cl.
CPC .............................. *G06F 21/6218* (2013.01)

(58) Field of Classification Search
CPC .......... G06F 21/6218; G06F 17/30761; G06F 2221/2141; G06F 13/362; G06F 13/368; G07C 2209/04; H04L 63/101; H04L 29/06829
USPC ........................................................ 726/28
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |

(Continued)

*Primary Examiner* — Ashokkumar B Patel
*Assistant Examiner* — William B Jones
(74) *Attorney, Agent, or Firm* — Schwabe Williamson & Wyatt

(57) ABSTRACT

A permission management system enables a system administrator to more effectively manage the large number of permissions associated with database systems. The permission management system accumulates groups of permissions associated with selected users, profiles, or permission sets. The permission management system then performs selectable comparisons on the different groups of permissions, such as identifying common permissions, unique permissions, and differing permissions. The permission management system also may identify permissions in a first permission group that do not exist in a second permission group and assign the identified permissions to the second permission group.

20 Claims, 8 Drawing Sheets

(56) References Cited

U.S. PATENT DOCUMENTS

| | | |
|---|---|---|
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0156031 A1* | 7/2006 | Sturms ............... G06F 21/6218 713/189 |
| 2007/0130130 A1* | 6/2007 | Chan ............... G06F 17/30477 |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |

(56) References Cited

U.S. PATENT DOCUMENTS

| | | | |
|---|---|---|---|
| 2011/0004621 A1* | 1/2011 | Kelley | G06Q 10/06 |
| | | | 707/769 |
| 2011/0218958 A1 | 9/2011 | Warshavsky | |
| 2011/0247051 A1 | 10/2011 | Bulumulla | |
| 2011/0277027 A1* | 11/2011 | Hayton | H04L 63/0815 |
| | | | 726/8 |
| 2012/0042218 A1 | 2/2012 | Cinarkaya | |
| 2012/0233137 A1 | 9/2012 | Jakobson et al. | |
| 2012/0240220 A1* | 9/2012 | Smith | G06F 21/34 |
| | | | 726/17 |
| 2012/0290407 A1 | 11/2012 | Hubbard et al. | |
| 2013/0212497 A1 | 8/2013 | Zelenko et al. | |
| 2013/0218948 A1 | 8/2013 | Jakobson | |
| 2013/0218949 A1 | 8/2013 | Jakobson | |
| 2013/0218966 A1 | 8/2013 | Jakobson | |
| 2013/0247216 A1 | 9/2013 | Cinarkaya | |
| 2014/0359537 A1 | 12/2014 | Jackobson et al. | |

\* cited by examiner

PERMISSION COMPARATOR

CLAIM OF PRIORITY

This application claims the benefit of U.S. Provisional Patent Application 62/041,748 entitled: COMPARING USERS, PROFILES, AND PERMISSION SETS, by John Arlan Brock et al., filed Aug. 26, 2014, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

The technology relates to comparing and managing permissions.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed inventions.

Database systems may have complex access controls that determine how users access information and applications. For example, user permissions can specify whether a user can view records, create records, edit records, or delete records. These access controls may scale into the hundreds of thousands.

Access controls becomes more complex as additional containers of permissions are assigned to users. For example, a user may have a profile with one set of permissions. The same user may have multiple permission sets with additional permissions. Managing all of the permissions associated with different users has become complex and time consuming.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

DETAILED DESCRIPTION

Figure 1A:
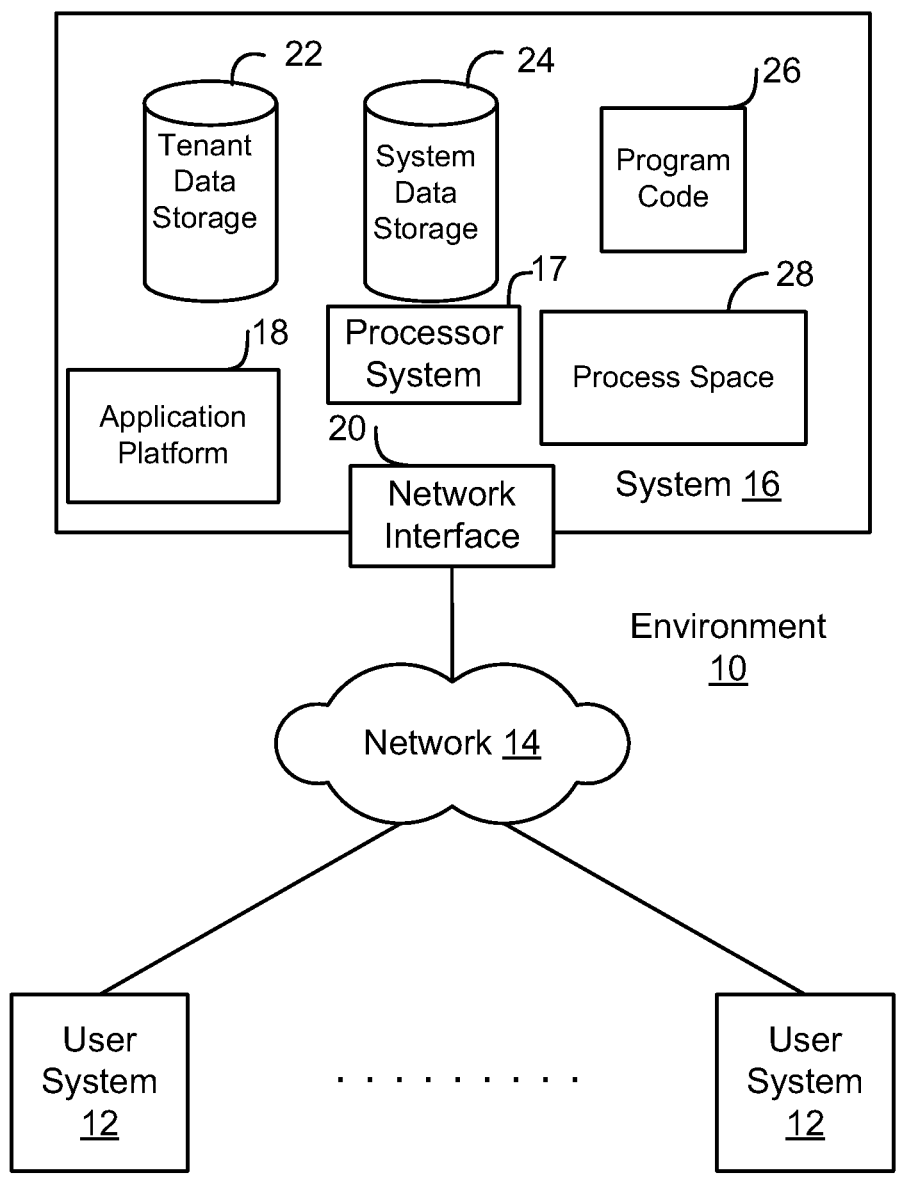
FIG. 1A shows a block diagram of an example environment in which an on-demand database service can be used according to some implementations.

Examples of systems, apparatus, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring the disclosed implementations. Other implementations and applications also are possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

Some implementations described and referenced herein are directed to systems, apparatus, computer-implemented methods and computer-readable storage media for identifying articles helpful in resolving user queries.

A database system might display a case associated with a customer support query. The database system may initiate a search for other cases related to the new case. The database system may extract relevant terms from the title and/or description provided in the new case using a term weighting algorithm, such as more like this (MLT). The relevant terms are then used in a search query for identifying the related cases.

The database system identifies articles linked to the related cases, ranks the articles, and causes the articles to be displayed on a remote user system in an order based on the ranking. The database system may rank the articles based on a number of related cases linked to the articles. The database system also may rank the article based on other parameters, such as relevancy scores for the related cases, labels assigned to the cases, last modified dates of the related cases, etc.

The database system may identify more relevant articles by first finding related cases that use a similar vocabulary to describe similar customer problems. The database system then identifies the articles that were previously determined to help resolve the prior problems. Thus, the database system may bridge the gap between vocabularies used by customers to describe problems and vocabularies used in articles to describe solutions to those problems.

In some implementations, the users described herein are users (or "members") of an interactive online "enterprise social network," also referred to herein as an "enterprise social networking system," an "enterprise collaborative network," or more simply as an "enterprise network." Such online enterprise networks are increasingly becoming a common way to facilitate communication among people, any of whom can be recognized as enterprise users. One example of an online enterprise social network is Chatter®, provided by salesforce.com, inc. of San Francisco, Calif. salesforce.com, inc. is a provider of enterprise social networking services, customer relationship management (CRM) services and other database management services, any of which can be accessed and used in conjunction with the techniques disclosed herein in some implementations. These various services can be provided in a cloud computing environment as described herein, for example, in the context of a multi-tenant database system. Some of the described techniques or processes can be implemented without having to install software locally, that is, on computing devices of users interacting with services available through the cloud. While the disclosed implementations may be described with reference to Chatter® and more generally to enterprise social networking, those of ordinary skill in the art should understand that the disclosed techniques are neither limited to Chatter® nor to any other services and systems provided by salesforce.com, inc. and can be implemented in the context of various other database systems such as cloud-based systems that are not part of a multi-tenant database system or which do not provide enterprise social networking services.

I. Example System Overview

FIG. 1A shows a block diagram of an example of an environment 10 in which an on-demand database service can be used in accordance with some implementations. The environment 10 includes user systems 12, a network 14, a database system 16 (also referred to herein as a "cloud-based system"), a processor system 17, an application platform 18, a network interface 20, tenant database 22 for storing tenant data 23, system database 24 for storing system data 25, program code 26 for implementing various functions of the system 16, and process space 28 for executing database system processes and tenant-specific processes, such as running applications as part of an application hosting service. In some other implementations, environment 10 may not have all of these components or systems, or may have other components or systems instead of, or in addition to, those listed above.

In some implementations, the environment 10 is an environment in which an on-demand database service exists. An on-demand database service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand database service, users accessing the on-demand database service via user systems 12, or third party application developers accessing the on-demand database service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system related data, objects, and Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the system 16.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a LAN (local area network), WAN (wide area network), telephone network, wireless network, cellular network, point-to-point network, star network, token ring network, hub network, or other appropriate configuration. The network 14 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 12 can communicate with system 16 using TCP/IP and, at a higher network level, other common Internet protocols to communicate, such as HTTP, FTP, AFS, WAP, etc. In an example where HTTP is used, each user system 12 can include an HTTP client commonly referred to as a "web browser" or simply a "browser" for sending and receiving HTTP signals to and from an HTTP server of the system 16. Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can be implemented as any computing device(s) or other data processing apparatus or systems usable by users to access the database system 16. For example, any of user systems 12 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 12 typically executes an HTTP client, for example, a web browsing (or simply "browsing") program, such as a web browser based on the WebKit platform, Microsoft's Internet Explorer browser, Apple's Safari, Google's Chrome, Opera's browser, or Mozilla's Firefox browser, or the like, allowing a user (for example, a subscriber of on-demand services provided by the system 16) of the user system 12 to access, process and view information, pages and applications available to it from the system 16 over the network 14.

Each user system 12 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using a central processing unit (CPU) such as an Intel Pentium® processor or the like. Similarly, the system 16 (and additional instances of an MTS, where more than one is present) and all of its components can be operator-configurable using application(s) including computer code to run using the processor system 17, which may be implemented to include a CPU, which may include an Intel Pentium® processor or the like, or multiple CPUs.

The system 16 includes tangible computer-readable media having non-transitory instructions stored thereon/in that are executable by or used to program a server or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 1B:
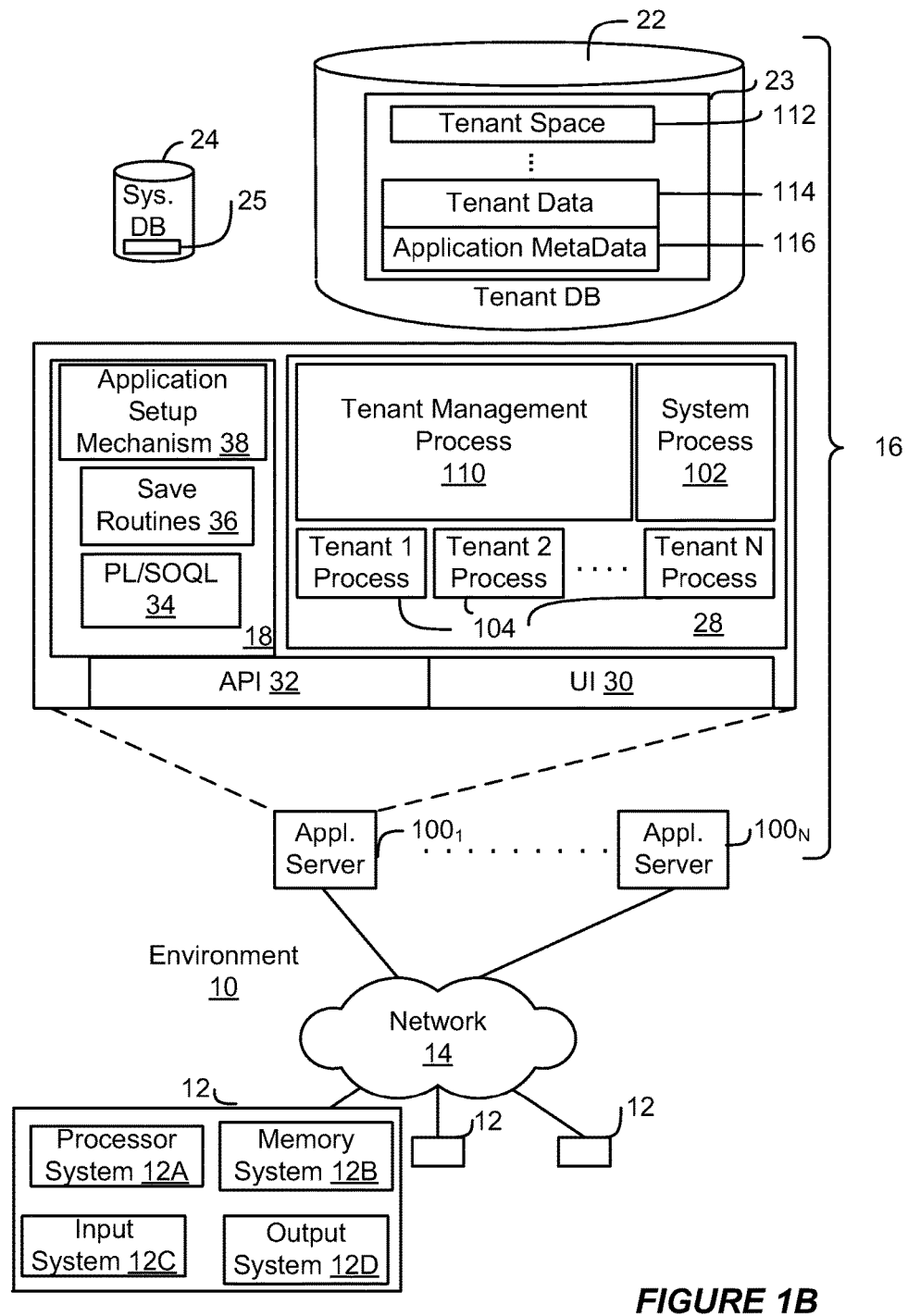
FIG. 1B shows a block diagram of example implementations of elements of FIG. 1A and example interconnections between these elements according to some implementations.

FIG. 1B shows a block diagram of example implementations of elements of FIG. 1A and example interconnections between these elements according to some implementations. That is, FIG. 1B also illustrates environment 10, but FIG. 1B, various elements of the system 16 and various interconnections between such elements are shown with more specificity according to some more specific implementations. Additionally, in FIG. 1B, the user system 12 includes a processor system 12A, a memory system 12B, an input system 12C, and an output system 12D. The processor system 12A can include any suitable combination of one or more processors. The memory system 12B can include any suitable combination of one or more memory devices. The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks.

In FIG. 1B, the network interface 20 is implemented as a set of HTTP application servers $100_1$-$100_N$. Each application server 100, also referred to herein as an "app server", is configured to communicate with tenant database 22 and the tenant data 23 therein, as well as system database 24 and the system data 25 therein, to serve requests received from the user systems 12. The tenant data 23 can be divided into individual tenant storage spaces 112, which can be physically or logically arranged or divided. Within each tenant storage space 112, user storage 114 and application metadata 116 can similarly be allocated for each user. For example, a copy of a user's most recently used (MRU) items can be stored to user storage 114. Similarly, a copy of MRU items for an entire organization that is a tenant can be stored to tenant storage space 112.

The process space 28 includes system process space 102, individual tenant process spaces 104 and a tenant management process space 110. The application platform 18 includes an application setup mechanism 38 that supports application developers' creation and management of applications. Such applications and others can be saved as metadata into tenant database 22 by save routines 36 for execution by subscribers as one or more tenant process spaces 104 managed by tenant management process 110, for example. Invocations to such applications can be coded using PL/SOQL 34, which provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 116 for the subscriber making the invocation and executing the metadata as an application in a virtual machine.

The system 16 of FIG. 1B also includes a user interface (UI) 30 and an application programming interface (API) 32 to system 16 resident processes to users or developers at user systems 12. In some other implementations, the environment 10 may not have the same elements as those listed above or may have other elements instead of, or in addition to, those listed above.

Each application server 100 can be communicably coupled with tenant database 22 and system database 24, for example, having access to tenant data 23 and system data 25, respectively, via a different network connection. For example, one application server $100_1$ can be coupled via the network 14 (for example, the Internet), another application server $100_{N-1}$ can be coupled via a direct network link, and another application server $100_N$ can be coupled by yet a different network connection. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used.

In some implementations, each application server 100 is configured to handle requests for any user associated with any organization that is a tenant of the system 16. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between the application servers 100 and the user systems 12 to distribute requests to the application servers 100. In one implementation, the load balancer uses a least-connections algorithm to route user requests to the application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which system 16 handles storage of, and access to, different objects, data and applications across disparate users and organizations.

In one example storage use case, one tenant can be a company that employs a sales force where each salesperson uses system 16 to manage aspects of their sales. A user can maintain contact data, leads data, customer follow-up data, performance data, goals and progress data, etc., all applicable to that user's personal sales process (for example, in tenant database 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the system 16. Such requests and updates can involve sending one or more queries to tenant database 22 or system database 24. The system 16 (for example, an application server 100 in the system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

II. Permission Management System

A permission management system compares users, profiles, and permission sets to determine similarities, differences, and unique constraints of associated permissions. For example, the permission management system may identify a first user with access to an object and identify a second user lacking access to the same object. A system administrator can then assign the identified permissions for the first user to the second user. The permission management system also may identify differences and similarities between profiles and permission sets so unneeded profiles and permission sets can be removed.

The system administrator can drag and drop a first identifier into a header for a first comparison column. For example, the system administrator may drag and drop an identifier associated with a first user, a first profile, or a first permission set into the first header. The system administrator then may drag and drop a second identifier into a header for a second comparison column. For example, the system administrator may drag and drop an identifier associated with a second user, a second profile, or a second permission set into the second header.

The permission management system identifies all of the permissions associated with the first and second identifiers. For example, the permission management system may combine all of the permissions for the profile and permissions sets of a first user into the first comparison column and combine all of the permissions for the profile and permissions sets of a second user into the second comparison column.

The permission management system then may identify common permissions for both the first and second user or identify unique permissions that exist for only one of the first or second user. The permission management system also may compare permissions for three or more permission items and identify any differing permissions that are not common to the three or more items.

The permission management system may compare any combination of users, profiles, and/or permission sets. The comparison system combines users, profiles, and/or permission sets into a same data structure and performs direct comparisons between permissions combined together in different data containers. The permission management system also may generate reports based on the comparisons for monitoring, archiving, auditing and compliance purposes.

The permission management system also may generate new permission sets that include the permissions for a first permission group that do not exist in a second permission group. For example, a first user may need the same access settings as a second user. The system administrator simply drags and drops identifiers for the first and second user into the headers. The permission management system identifies a set of permissions for the second user that do not exist for the first user. The permission management system then assigns the identified set of permissions to the first user.

Figure 2:
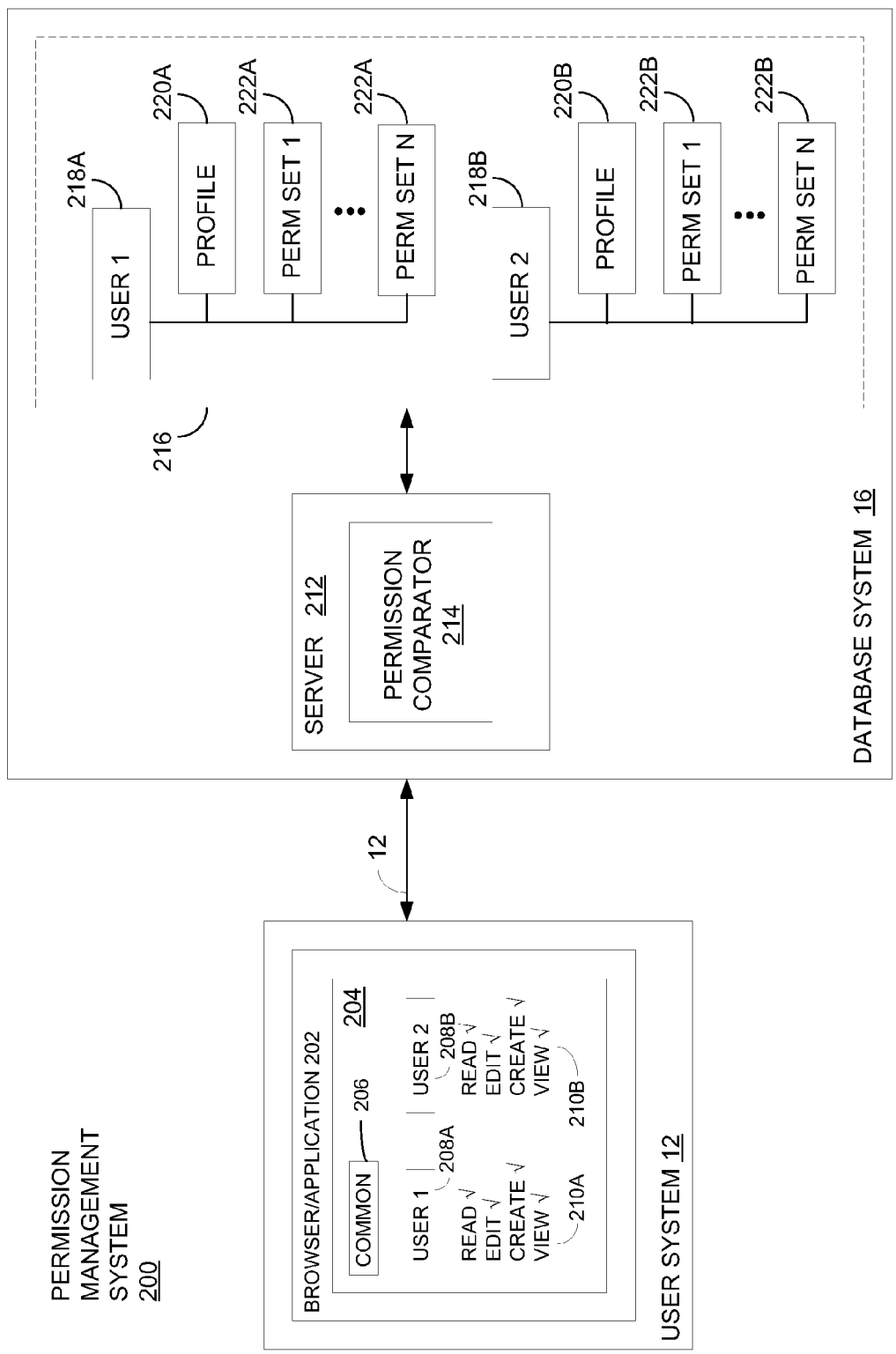
FIG. 2 shows a permission management system accordingly to some implementations.

FIG. 2 shows a permission management system 200 according to some implementations. A database system 16 as described above may include a server 212 that operates a permission comparator 214 and different storage devices that store permissions 216.

Permissions 216 may specify what tasks users can perform and what features and data users may access. For example, users with a view setup and configuration permission may view setup pages, and users with an application program interface (API) enabled permission may access APIs.

Permissions 216 may include any setting that controls access to any data, tool, function, document, application, object, code, class, page, or any other software or hardware element. Permissions 216 may specify any type of access such as view, write, edit, create, delete, read, run, enable, view all, modify all, view setup, edit setup, delete setup, or the like, or any combination thereof. These are just examples and permissions 216 may control any type of access to any type of data, software, and/or hardware.

Users may be assigned unique identifiers (user ids) referred to generally as users 218. Users 218 may have associated profiles 220 and one or more associated permission sets 222.

Profiles 220 may define how users 218 access records, see data, and run applications. Profiles 220 may represent a functional role or job category associated with users 218. For example, different profiles 220 may be associated with a system administrator, sales representative, service representative, west coast sales, east coast sales, etc. Of course these are also just examples and profiles 220 may be associated with any classification associated with users 218.

Permission sets 222 are collections of settings and permissions that also give users access to various tools and functions. Permission sets 222 may provide access for more specific functions or roles, such as account manager or vice president of engineering, etc. Multiple permission sets 222 may be assigned to the same user 218. The settings and permissions in permission sets 222 also may be found in profiles 220, and permission sets 222 may extend functional access for users 218 without changing profiles 220.

A permission 216 might not be enabled in profile 220A but might be enabled in one of permission sets 222A, or visa versa. For example, if a manage password policies permission is not enabled in profile 220A, but is enabled in one of permission sets 222A, user 218A may be able to manage password policies.

A second user 218B may have a profile 220B that is the same or different from profile 220A for user 218A. User 21B may have one or more permissions sets 222B that are the same or different from permission sets 222A assigned to user 218A.

User system 12 as described above connects to server 212 in database system 16 via any of the networks 12 described above. User system 12 operates a web browser or application 202 that displays a user interface 204 for accessing permission comparator 214.

The system administrator may enter a first item into a first header 208A. For example, the system administrator may drag and drop user id 218A into header 208A. In response to selecting user id 218A, permission comparator 214 may download all of the permissions 216 in profile 220A and all of the permissions in permission sets 222A. For example, profile 220A and permission sets 222A may be linked to user id 218A. Permission comparator 214 identifies unique id 218A in header 208A and then makes API calls to profile 220A and permission sets 222A linked to user id 218A.

Permission comparator 214 may identify every check marked permission in profile 220A and permission sets 222A. Comparator 214 then may remove duplicate permissions enabled in more than one of profile 220A and permission sets 222A and use the most permissive setting when different permissions are assigned to a same item.

For example, profile 220A may include read and edit permissions for a particular object and one of permission sets 222A may only include read permission for the same object. Comparator 214 identifies user 218A as having read and edit permissions for the object. Similarly, permission sets 222A may not include a permission to run a particular application but profile 220A may include a permission to run the application. Comparator 214 identifies the application as enabled for user 218A.

Comparator 214 identifies and combines permissions from profiles 220 and permission sets 222 into containers and displays the containers of permissions on user interface 204 as permission groups 210. This may substantially reduce the amount of time typically needed for identifying all of the different layers of permissions associated with a user, profile, or permission set. Permission comparator 214 also creates permission groups 210 in real-time in response to the system administrator entering user ids 218 into headers 208. Thus, the system administrator can view up to the minute permission status for any selectable user 218, profile 220, or permission set 222 without having to manually maintain spreadsheets.

Permission management system 200 provides the additional advantage of comparing the different permission groups 210. For example, the system administrator may drag user id 218A into header 208A and drag user id 218B into header 208B. Comparator 214 may create permission group 210A from profile 220A and permission sets 222A and create permission group 210B from profile 220B and permission sets 222B.

The system administrator may select a comparison operator 206 that determines how permission comparator 214 compares permission group 210A with permission group 210B. For example, the system administrator may select a common operator 206. In response to selecting common operator 206, comparator 214 identifies all of the common permissions that exist in both permission group 210A and permission group 210B. For example, comparator 214 may identify read, edit, create, and view permissions for a same object in both permission group 210A and permission group 210B. Permission comparator 214 may perform other types of comparisons based on other operators 206 that are described in more detail below.

Figure 3:
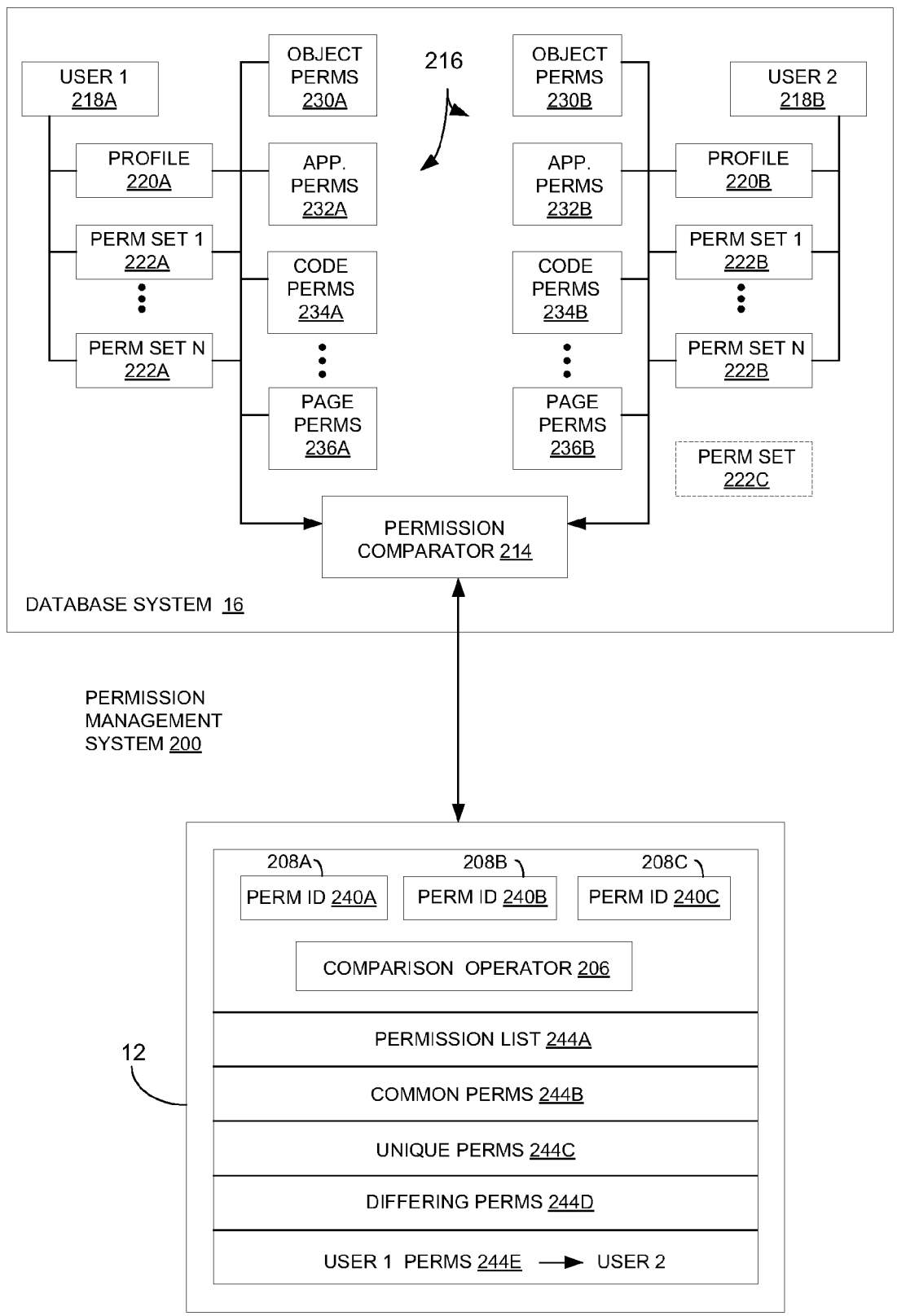
FIG. 3 shows the permission management system of FIG. 2 in more detail.

FIG. 3 shows the permission management system in more detail according to some implementations. Profiles 220 and permission sets 222 may include any combination of permissions 216, such as object permissions 230, application permissions 232, code permissions 234, and page permissions 236. These are just a few examples of any number and combination of different types of permissions 216 associated with profile 220 and permission sets 222.

Object permission 230 may identify permissions associated with different types of objects, such as accounts, reports, clients, customers, assets, audit, contacts, custom objects, etc. A single account object for example, may have hundreds or thousands of individual customer objects and each customer object may have hundreds of fields, tabs, etc. each having associated permissions 216.

Application permissions 232 enable user 218 to run different software applications, and access different tabs within the applications. For example, application permissions 232 may enable a user to run an analytics application, call center application, expense report application, analytics application, application launcher, call center application, etc. A user might not see applications that are not set in application permissions 232.

Code permissions 234 may include custom permissions created from custom written software. Code permissions 234 may determine what code a user may execute. For example, code permissions may determine what users may execute methods in a particular class. Page permissions 236 may enable a user to access, view, edit, and/or execute particular pages in different applications, objects, or documents.

Permissions 216 may include any type of access, such as access, read, create, edit, delete, view all, modify all, view setup, edit setup, delete setup, etc. For example, a system administrator may have read, create, edit, and delete, view all, and modify all permissions for a particular object. Other users may only have read, create, and edit permissions for the object.

As described above, a system administrator may enter identifiers 240 into headers 208. Permission comparator 214 identifies all of the permissions 216 associated with the selected identifiers 240. For example, the system administrator may enter an identifier 240A for profile 220A into header 208A. Comparator 214 accumulates and displays all permissions from profile 220A in permission group 244A.

In another example, the system administrator may enter an identifier 240A associated with one of permission sets 222A into header 208A. Comparator 214 accumulates and displays all permissions from the selected permission set 220A as permission group 244A.

As also discussed above, the system administrator may enter an identifier 240A associated with one of users 218 into header 208A. For example, the system administrator may enter the user id for user 218B into header 208A. Comparator 214 assembles all of the permissions for profile 220B and permissions sets 222B into permission group 244A.

Permission management system 200 may identify common permissions 224B between different selected identifiers 240. For example, the system administrator may want to identify the common permissions between user 218A and user 218B. The system administrator enters user ids 240A and 240B for users 218A and 218B into headers 208A and 208B, respectively. The system administrator then selects a common comparison operator 206 that directs permission comparator 214 to identify the common permissions for users 218A and 218B.

Permission comparator 214 creates permission groups for user 218A and 218B and displays common permissions 224B. For example, user 218A and user 218B may both have the same access permission for a same application. The application permission is displayed in common permissions 244B.

The system administrator may enter any combination and number of identifiers 240 into headers 208. For example, the system administrator may enter an identifier 240A into header 208A associated with profile 220A or one of permission sets 222A and enter an identifier 240B into header 208B associated with profile 220B or one of permission sets 222B. In another example, the system administrator may enter an identifier 240A into header 208A for a first permission set 222A associated with user 218A and enter a second identifier 240B into header 208B for a second permission set 222A associated the same user 218A.

Permission management system 200 also may identify unique permissions 224C for different selected identifiers 240. For example, the system administrator may want to identify unique permissions 244C that exist in profile 220A but do not exist in profile 220B and also identify unique permissions 244C that exist in profile 220B but do not exist in profile 220A. The system administrator enters identifiers 240A and 240B for profiles 220A and 220B into headers 208A and 208B, respectively. The system administrator then selects a unique comparison operator 206 that directs permission comparator to identify unique permissions 244C in profiles 220A and 220B.

Permission management system 200 may identify differing permissions 244D for multiple selected identifiers 240A, 240B, and 240C. For example, the system administrator may want to identify differing permissions 244D that are not common in three or more different permission sets 222. Differing permissions 244D help the system administrator identify permission differences by filtering out common permissions that may exist in all of the selected permission groups.

The system administrator enters identifiers 240A, 240B, and 240C for three different permission sets 222 into headers 208A, 208B, and 208C, respectively. The system administrator then selects a differing comparison operator 206 that directs permission comparator 214 to identify differing permissions 244D that are not common to all three selected permission sets 220.

Permission management system 200 may assign permissions for a first user 218A to a second user 218B. For example, user 218B may need to take over the job responsibilities of user 218A while on vacation. The system administrator enters identifiers 240A and 240B for users 218A and user 218B into headers 208A and 208B, respectively. The system administrator then selects an assign permissions operator 206.

In response to inputs 240 and 206, permission comparator 214 identifies all of the permissions in profile 220A and permission sets 222A associated with user 218A that do not exist in profile 220B and permission sets 222B associated with user 218B. Permission comparator 214 then may generate a new permission set 222C that includes the identified permissions for user 218A and assign permission set 222C to user 218B. New permission set 222C provides user 218B with the access rights of user 218A. After user 218A returns from vacation, the system administrator may simply delete permission set 222C.

Figure 4:
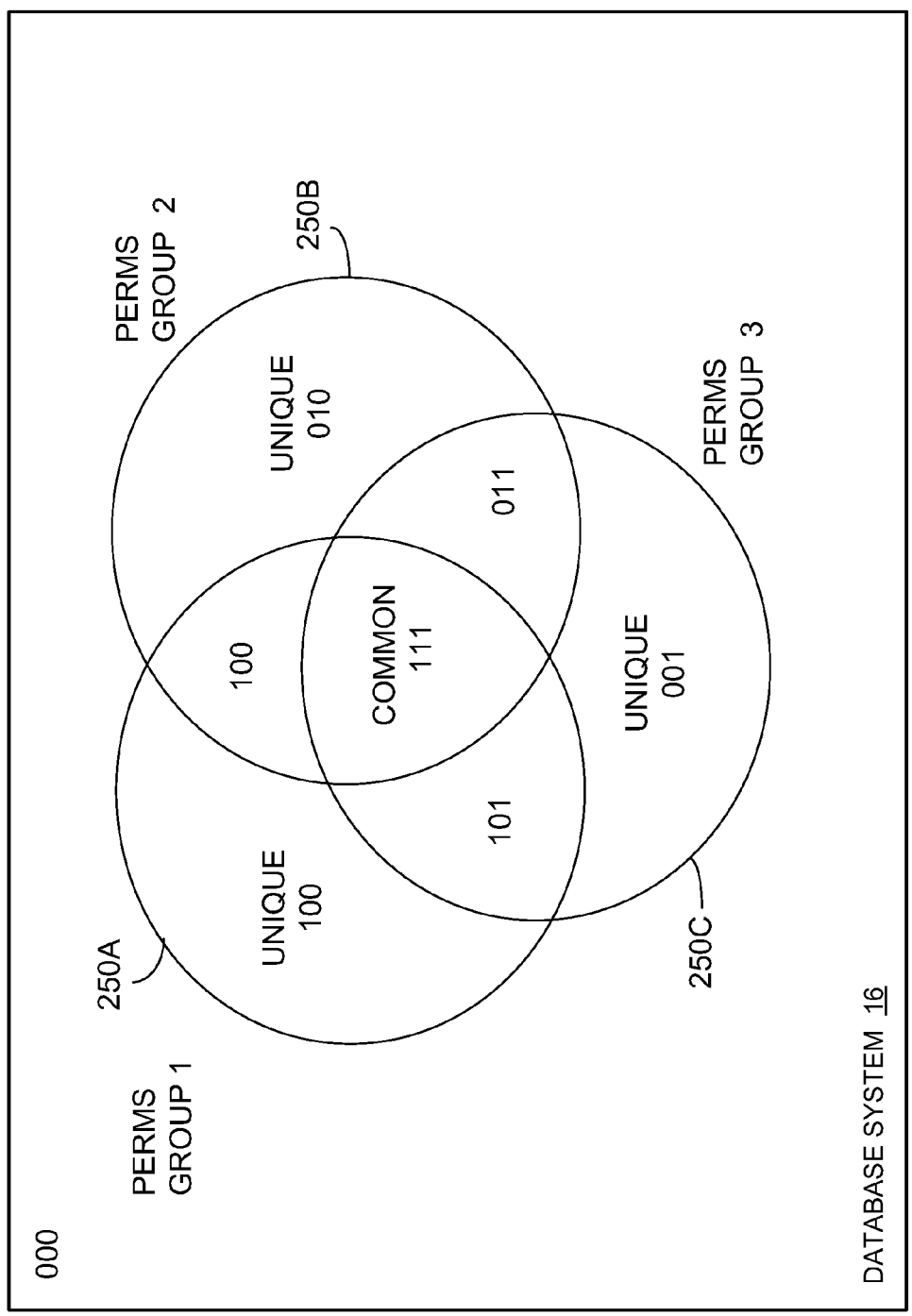
FIG. 4 shows different permission operations performed by a permission comparator accordingly to some implementations.

FIG. 4 shows different comparisons performed by the permission comparator according to some implementations. Each circle 250 represents a group of permissions. For example, circle 250A may represent all of the permissions associated with a first user, circle 250B may represent all of the permissions associated with a second user, and circle 250C may represent all of the permissions associated with a third user. In other examples, circles 250 may represent groups of permissions associated with different profiles, permission sets, or any other permission category.

Permissions 000 represent all of the permissions in database system 16. Common permissions 111 correspond with common permissions 244B in FIG. 3 and exist in all three permission groups 250A, 250B, or 250C.

Unique permissions 100, 010, and 001 correspond to unique permissions 244C in FIG. 3 and only exist in permission groups 250A, 250B, and 250C, respectively. Unique permissions may help identify permissions that a particular group might have but not need. For example, unique permissions may identify a particular user or profile with access to a call center application and identify all other users or profiles as not having access to the call center application.

Permissions 110 exist in both permission group 250A and permission group 250B, permissions 011 exist in both permission group 250B and permission group 250C, and permissions 101 exist in permission group 250A and permission group 250C. Unique permissions 100, 010, and 001 together with partially common permissions 110, 011, and 101 represent differing permissions 244D in FIG. 3. Differing permissions 244D in FIG. 3 are all permissions in groups 250A, 250B, and 250C, other than common permissions 111.

As mentioned before, differing permissions filter out all common permissions 111 that may exist in all three permission groups 250A, 250B, and 250C. Differing permissions 001, 011, 010, 110, 100, and 101 may help identify permissions that a particular permission group may need. For example, differing permissions may identify the east and west coast sales regions as having access to a recruiting application, and identify the southwest sales region as not having access to the recruiting application.

Figure 5:
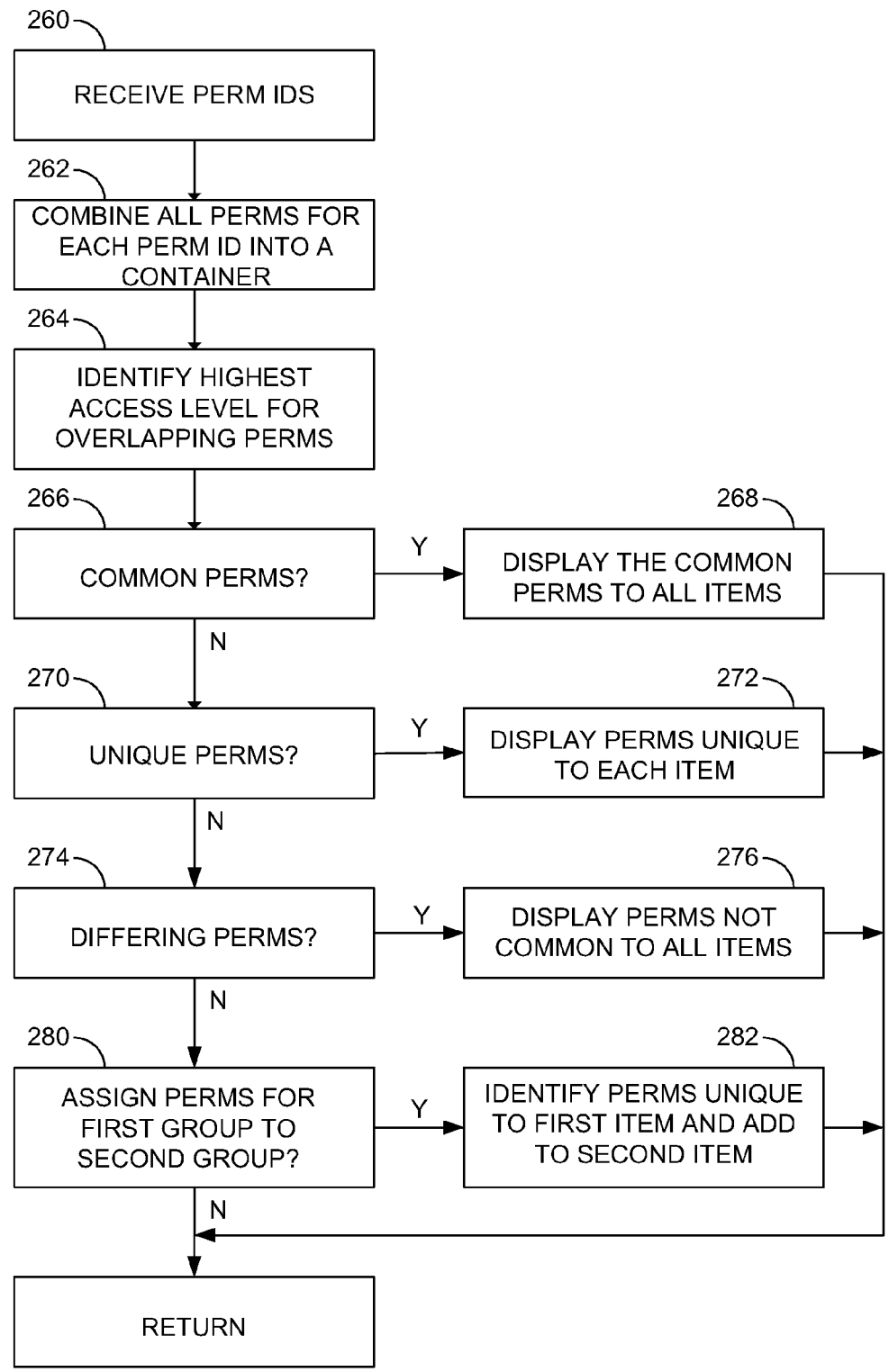
FIG. 5 shows an example process for comparing permissions accordingly to some implementations.

FIG. 5 shows a permission management process according to some implementations. In operation 260, the permission comparator receives one or more identifiers. For example, the permission comparator may receive one or more identifiers associated with users, profiles, and/or permission sets.

In operation 262, the comparator combines all of the permissions associated with each identifier into a same group or container of permissions. For example, the comparator combines together all of the permissions associated with a selected user, profile, and/or permission set.

In operation 264, the comparator gleans the permission groups by removing lower access levels for the same items. As explained above, a profile and permission sets for a same user may each assign different permissions to the same item. The comparator removes the more restrictive permission.

In operation 266, the comparator may receive a common permission operator. For example, the system administrator may request the comparator to identify the common permissions between two or more groups of permissions. In operation 268, the comparator parses the two or more groups and displays the common permissions.

In operation 270, the comparator may receive a unique operator. For example, the system administrator may request the comparator to identify the unique permissions between the two or more permission groups. In operation 272, the comparator displays the unique permissions in the two or more groups.

In operation 274, the comparator may receive a differing operator. For example, the system administrator may request the comparator to identify all of the permissions that are not common to all of the selected permission groups. In operation 276, the comparator displays the differing permissions for the selected groups.

In operation 280, the comparator may receive a permission assignment operator. For example, the system administrator may request the comparator to assign permissions for a first group of permissions to a second group of permissions. In operation 282, the comparator generates a new permission set that contains all of the first group of permissions that do not exist in the second group of permissions. The comparator then assigns the permission set to the second group of permissions.

Figure 6:
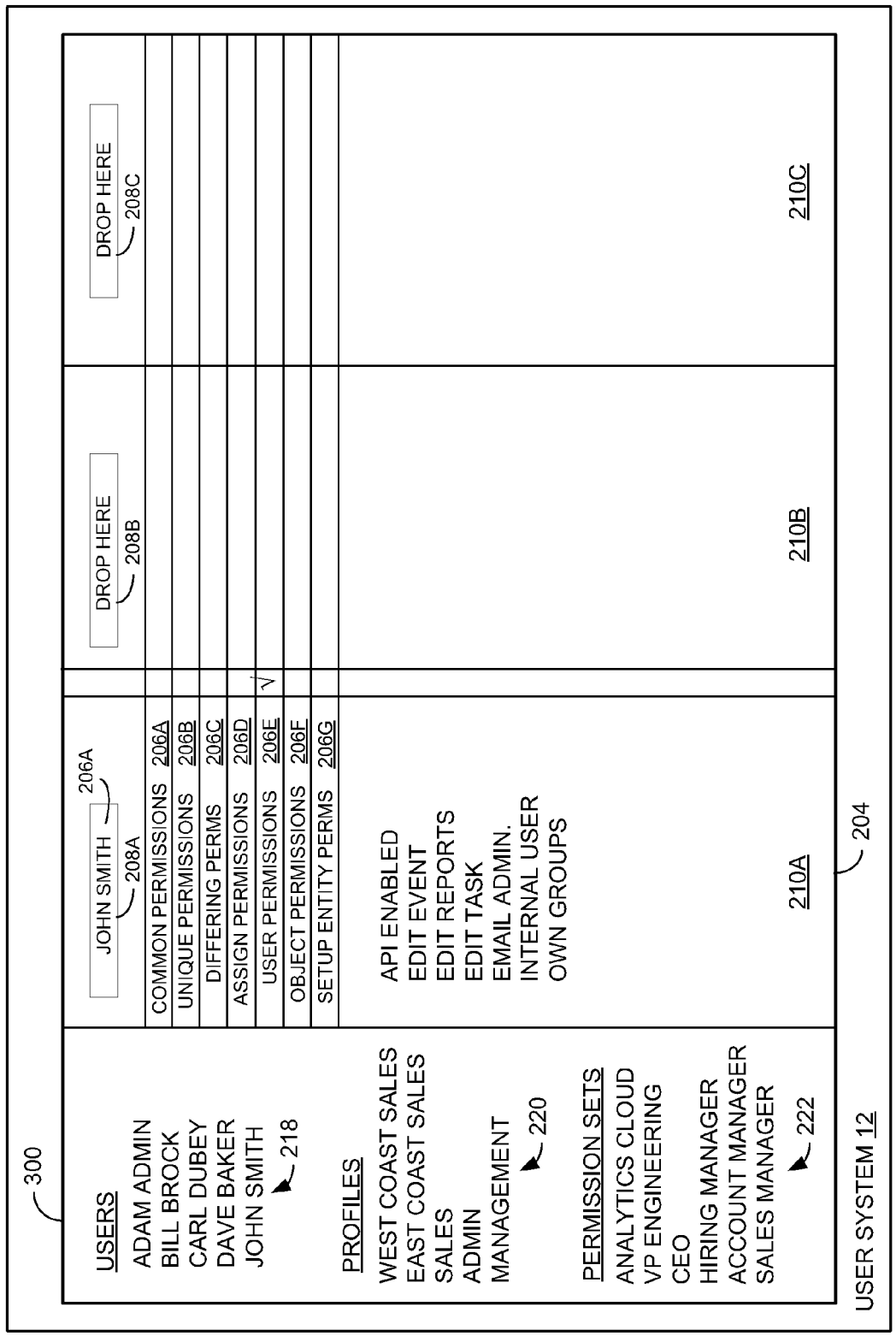
FIG. 6 shows an example user interface displaying user permissions according to some implementations.

FIG. 6 shows the user interface for the permission management system according to some implementations. Referring to FIGS. 2 and 6, the permission comparator may display names 300 for items in different permission categories. For example, user interface 204 may display names 300 for users 218, profiles 220, and/or permission sets 222 configured in the database system.

User interface 204 also may display different operators 206 that direct permissions comparator 214 to perform different operations and comparisons. For example, operator 206A may direct the permission comparator to identify common permissions, operator 206B may direct the permission comparator to identify unique permissions, operator 206C may direct the permission comparator to identify differing permissions, and operator 206D may direct the permission comparator to assign permissions for a first permission group to a second permission group as discussed above.

Operators 206 also may direct the permissions comparator to identify different types of permissions. For example, operator 206E may direct the permission comparator to identify all of the permissions associated with a selected user. An operator 206F may direct the permission comparator to identify object permissions associated with a selected user, profile, or permission set. An operator 206G may direct the permission comparator to identify setup entity permissions associated with a selected user, profile, or permission set. These are just a few examples of different permission operations that be initiated in user interface 204.

The system administrator may drag and drop any of names 300 into any of headers 208. In the example of FIG. 6, the system administrator drags and drops user name John Smith into header 208A. The system administrator also selects user permissions operator 206E. In response to the selections, permission comparator 214 in FIG. 2 creates permission group 210A associated with user John Smith. As mentioned above, permission group 210A may include all profile permissions and permission sets associated with user John Smith.

Figure 7:
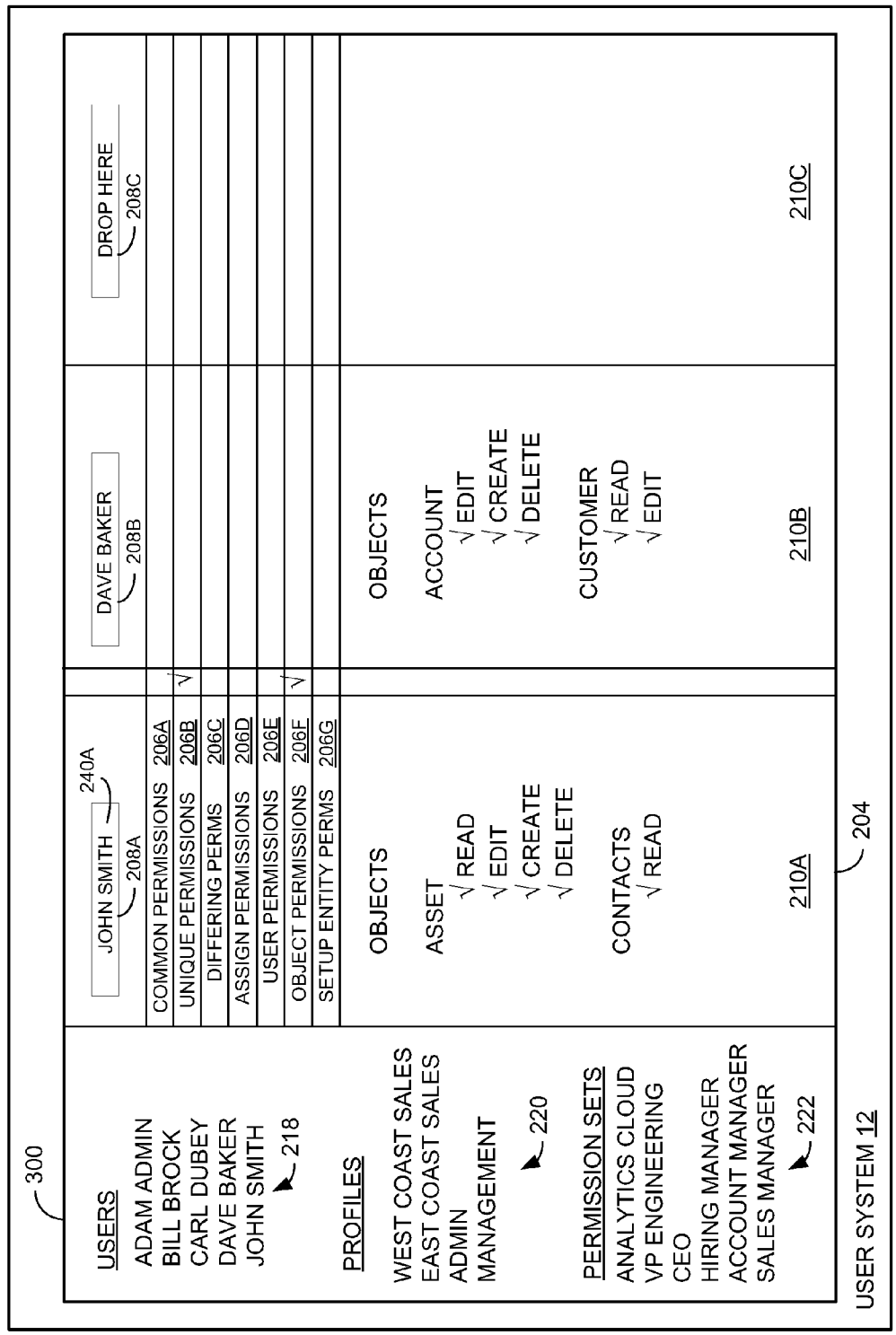
FIG. 7 shows an example user interface comparing different user permissions according to some implementations.

FIG. 7 shows another example of the user interface according to some implementations. In this example, the system administrator drags and drops the name John Smith from users 218 into header 208A and drags and drops the name Dave Baker from users 218 into header 208B. The system administrator also selects unique permissions operator 206B and object permissions operator 206F.

In response to the selections in FIG. 7, the permission comparator accumulates all of the object permissions for user John Smith into one group and accumulates all of the object permissions for user Dave Baker into a second group. The permission comparator then identifies a first subgroup of object permissions 210A assigned to John Smith but not assigned to Dave Baker. The permission comparator also identifies a second subgroup of object permissions 210B assigned to Dave Baker but not assigned to John Smith.

Permission group 210A shows that John Smith has read, edit, create, and delete permission for an asset object and that user Dave Baker has no read, edit, create, or delete permissions for the asset object. Permissions 210A also show that John Smith has read permission for a contacts object and that user Dave Baker has no read permission for the contacts object.

Permission group 210B shows that Dave Baker has edit, create, and delete permissions for an account object and that user John Smith has no edit, create, or delete permission for the account object. Permissions 210B also show that user Dave Baker has read and edit permission for a customer object and that user John Smith has no read or edit permission for the customer object.

In another example, the system administrator may drag and drop two or more profiles 220 into headers 208 to compare permissions associated with the different job functions.

In another example, a user 218 may move to a new sales territory. The system administrator may create a new profile 220 for the sales territory and assign the new profile to the user. The system administrator may user interface 204 to compare the new profile with the previous profile for the user and ensure the user retains permissions for both previous and new job assignments. FIGS. 6 and 7 are just a few examples of how the permission management system generates and compares permission groups for different selectable permission categories.

Thus, the permission management system enables system administrators to more efficiently manage the large number of permissions associated with a database system. The permission management system also accesses the database system permissions in real time providing more accurate permission management.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects. Additionally, while the disclosed examples are often described herein with reference to an implementation in which an on-demand database service environment is implemented in a system having an application server providing a front end for an on-demand database service capable of supporting multiple tenants, the present implementations are not limited to multi-tenant databases or deployment on application servers. Implementations may be practiced using other database architectures, i.e., ORACLE®, DB2® by IBM and the like without departing from the scope of the implementations claimed.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Additionally, any of the software components or functions described in this application can be implemented as software code to be executed by one or more processors using any suitable computer language such as, for example, Java, C++ or Perl using, for example, existing or object-oriented techniques. The software code can be stored as a computer- or processor-executable instructions or commands on a physical non-transitory computer-readable medium. Examples of suitable media include random access memory (RAM), read only memory (ROM), magnetic media such as a hard-drive or a floppy disk, or an optical medium such as a compact disk (CD) or DVD (digital versatile disk), flash memory, and the like, or any combination of such storage or transmission devices. Computer-readable media encoded with the software/program code may be packaged with a compatible device or provided separately from other devices (for example, via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While some implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A database system for comparing permissions, the database system comprising:
   a processor; and
   one or more stored sequences of instructions stored on a non-transitory computer-readable media which, when executed by the processor, cause the processor to carry out the steps of:
   receiving, at a first time, a first identifier associated with a first user;
   retrieving, in response to receiving the first identifier, a first profile associated with the first identifier, the first profile associated with a first plurality of permission lists, wherein each permission list in the first plurality of permission lists includes one or more permissions;
   creating, at a second time subsequent to the first time, a first group of permissions by combining together each permission list of the first plurality of permission lists for the first user, and displaying the first group of permissions on a user interface, wherein combining includes resolving conflicting permissions between each permission list in the first plurality of permission lists;
   receiving, at a third time, a second identifier associated with a second user;
   retrieving, in response to receiving the second identifier, a second profile associated with the second identifier, the second profile associated with a second plurality of permission lists, wherein each permission list in the second plurality of permission lists includes one or more permissions;
   creating, at a fourth time subsequent to the third time, a second group of permissions by combining together each permission list of the second plurality of permission lists for the second user, and displaying the second group of permissions on the user interface, wherein the second group of permissions is created and displayed separately from the first group of permissions, and wherein combining includes resolving conflicting permissions between each permission list in the second plurality of permission lists;
   receiving a comparator operator;
   comparing the first group of permissions with the second group of permissions based on the comparator operator, the comparator operator determining how the comparison is to be carried out;
   generating in real-time a new permission list resulting from the comparison of the first group of permissions and the second group of permissions, wherein the new permission list is different from the first group of permissions and the second group of permissions and not assigned to any users;
   sending the new permission list as results of the comparison to the user interface to display separately from the first group of permissions and the second group of permissions;
   receiving a permission assignment operator; and
   assigning the new permission list to one of the first user or second user based on the permissions assignment operator.

2. The database system of claim 1, wherein the instructions further cause the processor to carry out the steps of:
  displaying in the new permission list common permissions between the first and second group of permissions;
  filtering from the new permission list unique permissions unique to only one of the first group of permissions or the second group of permissions; and
  displaying the filtered new permission list of the common permissions as the results of the comparison.

3. The database system of claim 1, wherein the instructions further cause the processor to carry out the steps of:
  displaying as the new permission list permissions unique to only one of the first group of permissions or the second group of permissions based on the comparator operator;
  filtering from the new permission list differing permissions between the first and second group of permissions; and
  displaying the filtered new permission list of the unique permissions as the results of the comparison.

4. The database system of claim 1, wherein the instructions further cause the processor to carry out the steps of:
  receiving, at a fifth time, a third identifier associated with a third user;
  retrieving, in response to receiving the third identifier, a third profile associated with the third identifier, the third profile associated with a third plurality of permission lists, wherein each permission list in the third plurality of permission lists includes one or more permissions;
  creating, at a sixth time subsequent to the fifth time, a third group of permissions by combining together each permission list of the third plurality of permission lists for the third user, and displaying the third group of permissions on the user interface, wherein combining includes resolving conflicting permissions between each permission list in the third plurality of permission lists;
  displaying, on the user interface, in the new permission list differing permissions that are not common in all three of the first, second, and third group of permissions;
  filtering from the new permission list common permissions that are common to at least two of the first, second, and third group of permissions; and
  displaying, on the user interface, the filtered new permission list of the differing permissions as the results of the comparison.

5. The database system of claim 1, wherein the instructions further cause the processor to carry out the steps of:
  identifying in the new permission list a set of permissions in the first group of permissions that are not in the second group of permissions; and
  assigning the new permission list to the second user.

6. The database system of claim 1, wherein
  resolving conflicting permissions for each permission list in the first plurality of permission lists and resolving conflicting permissions for each permission list in the second plurality of permission lists each comprise removing duplicate permissions.

7. The database system of claim 6, wherein
  resolving conflicting permissions for each permission list in the first plurality of permission lists and resolving conflicting permissions for each permission list in the second plurality of permission lists each further comprise retaining permissions that are more permissive.

8. The database system of claim 1, wherein the instructions further cause the processor to carry out the steps of:
  receiving a first user identifier, first profile identifier, or first permission set identifier as the first identifier;
  identifying all permissions associated with the first user identifier, first profile identifier, or first permission set identifier as the first group of permissions;
  receiving a second user identifier, second profile identifier, or second permission set identifier as the second identifier; and
  identifying all permissions associated with the second user identifier, second profile identifier, or second permission set identifier as the second group of permissions.

9. The database system of claim 1, wherein permission lists include at least one of an object permission, an application permission, a code permission, and a page permission.

10. A computer program stored in a non-transitory media for managing permissions in a database system, the computer program comprising a set of instructions operable to:
  display, on a user interface, identifiers associated with different permission categories for different users;
  detect selection, at a first time, of a first one of the identifiers;
  generate, at a second time subsequent to the first time, a first group of permissions associated with the first one of the identifiers, wherein the first group of permissions include separately grantable read, edit, create, and view permissions for same objects in the database system;
  display the first group of permissions on the user interface;
  detect selection, at a third time, of a second one of the identifiers;
  generate, at a fourth time subsequent to the third time, a second group of permissions separate from the first group of permissions associated with the second one of the identifiers wherein the second group of permissions include separately grantable read, edit, create, and view permissions for the same objects in the database system;
  display, separately from the first group of permissions, the second group of permissions on the user interface;
  detect selection of a comparison operator;
  compare the first group of permissions with the second group of permissions based on the comparison operator, the comparison operator to determine how the comparison is to be carried out;
  generate a new group of permissions in real-time resulting from the comparison between the first group of permissions and the second group of permissions, the new group of permissions different from the first group of permissions and the second group of permissions and currently not assigned to any of the users; and
  send the new group of permissions as results of the comparison to a user device for displaying on the user interface separately from the first group of permissions and the second group of permissions.

11. The computer program of claim 10, further comprising instructions operable to:
  identify a first user identifier, first profile identifier, or first permission set identifier associated with the first one of the identifiers;
  identify the permissions associated with the first user identifier, first profile identifier, and first permission set identifier as the first group of permissions;

identify a second user identifier, second profile identifier, or second permission set identifier associated with the second one of the identifiers; and identify the permissions associated with the second user identifier, second profile identifier, or second permission set identifier as the second group of permissions.

12. The computer program of claim 10, further comprising instructions operable to:

identify he first one of the identifiers as a user identifier;
identify a profile associated with the user identifier;
identify permission sets associated with the user identifier; and
combine permissions associated with the profile and permission sets into the first group of permissions,
wherein conflicting permissions between the profile and each permission set in the permission sets are resolved when the permissions are combined.

13. The computer program of claim 10, further comprising instructions operable to:

detect selection of the first one of the identifiers in response to a cursor dragging and dropping the first one of the identifiers into a first header; and
detect selection of the second one of the identifiers in response to the cursor dragging and dropping the second one of the identifiers into a second header.

14. The computer program of claim 10, further comprising instructions operable to:

identify object permissions, application permissions, code permissions, and page permissions in the first group of permissions;
identify object permissions, application permissions, code permissions, and page permissions in the second group of permissions; and
compare the object permissions, application permissions, code permissions, and page permissions in the first group of permissions with the object permissions, application permissions, code permissions, and page permissions in the second group of permissions.

15. The computer program of claim 10, further comprising instructions operable to:

identify a subgroup of permissions in the first group of permissions not common to the second group of permissions; and
assign the subgroup of permissions to the second one of the identifiers.

16. The computer program of claim 10, further comprising instructions operable to:

display common permissions identified in both the first group of permissions and the second group of permissions in response to the comparison operator indicating a common comparison.

17. The computer program of claim 10, further comprising instructions operable to:

display unique permissions located only in the first group of permissions or located only in the second group permissions in response to the comparison operator indicating a unique comparison.

18. The computer program of claim 10, further comprising instructions operable to:

detect selection, at a fifth time, of a third one of the identifiers;
generate, at a sixth time subsequent to the first time, a third group of permissions associated with the third one of the identifiers;

display, separately from the first and second groups of permissions, the third group of permissions on the user interface; and
display differing permissions that are not located in all three of the first group of permissions, second group of permissions, and third group of permissions in response to the comparison operator indicating a differing comparison.

19. A method for managing permissions in a database system comprising:

detecting, at a first time, selection of a first identifier for a first user, the first identifier associated with a first plurality of permission sets, each of the first plurality of permission sets including at least one permission;
sending a request to a permission management server to automatically create, at a second time subsequent to the first time, and display a first group of permissions associated with the first identifier by combining together each permission set of the first plurality of permission sets, wherein combining includes resolving conflicting permissions between each permission set in the first plurality of permission sets;
detecting, at a third time, selection of a second identifier for a second user, the second identifier associated with a second plurality of permission sets, each of the second plurality of permission sets including at least one permission;
sending a request to the permission management server to automatically create, at a fourth time subsequent to the third time, and display a second group of permissions associated with the second identifier by combining together each permission set of the second pluralit of permission sets, wherein combining includes resolving conflicting permissions between each permission set in the second plurality of permission sets;
detecting selection of a comparator operator; and
sending a request to the permission management server to:
automatically compare in real-time the first group of permissions for the first user with the second group of permissions for the second user based on the comparator operator, the comparator operator determining how the comparison is to be carried out;
automatically generate in real-time a third group of permissions different from the first group of permission and the second group of permissions as results of the comparison between the first group of permissions and the second group of permissions, the third group of permissions not currently assigned to the first user or the second user; and
display the third group of permissions on a user interface separately from the first group of permissions and the second group of permissions,
wherein permissions include at least one of an object permission, an application permission, a code permission, and a page permission.

20. The method of claim 19, further comprising:

receiving a request to add a permission set to the second user that includes permissions from the first group of permissions that are not in the second group of permissions; and
sending the request to the permission management server to assign the permission set to the second user.

* * * * *